(12) United States Patent
Johannesson

(10) Patent No.: US 7,211,123 B2
(45) Date of Patent: May 1, 2007

(54) APPARATUS FOR VENTING A TRANSMISSION

(75) Inventor: Sitg-Erik Johannesson, Kungalv (SE)

(73) Assignee: Volvo Lastvagnar AB (SE)

( * ) Notice: Subject to any disclaimer, the term of this patent is extended or adjusted under 35 U.S.C. 154(b) by 40 days.

(21) Appl. No.: 10/065,811

(22) Filed: Nov. 21, 2002

(65) Prior Publication Data

US 2003/0093981 A1 May 22, 2003

Related U.S. Application Data

(63) Continuation of application No. PCT/SE01/00792, filed on Apr. 10, 2001, now abandoned.

(30) Foreign Application Priority Data

May 25, 2000 (SE) .................................... 0001994

(51) Int. Cl.
*B01D 50/00* (2006.01)

(52) U.S. Cl. .............................. 55/321; 55/327; 55/331; 55/336; 55/463; 55/385.3; 55/385.4; 55/DIG. 17; 95/268; 74/606 R; 220/371; 220/373; 220/374

(58) Field of Classification Search ................ 55/385.1, 55/385.4, 385.3, 505, 510, 320, 327, 329, 55/321, 331, 336, 463, DIG. 17; 74/606 R; 220/371, 373, 374; 95/268
See application file for complete search history.

(56) References Cited

U.S. PATENT DOCUMENTS

| | | | | |
|---|---|---|---|---|
| 1,401,976 | A | * | 1/1922 | Giovannoni ................. 210/306 |
| 4,400,187 | A | * | 8/1983 | Lane ............................ 96/144 |
| 4,402,493 | A | * | 9/1983 | Tsuge ....................... 267/64.21 |
| 4,409,005 | A | * | 10/1983 | McKendrick .................. 95/26 |
| 4,554,844 | A | | 11/1985 | Hamano |
| 5,129,422 | A | | 7/1992 | Davison, Jr. et al. |
| 5,205,848 | A | * | 4/1993 | Blanc et al. ................... 55/310 |
| 5,409,526 | A | * | 4/1995 | Zheng et al. .................. 96/132 |
| 5,509,949 | A | * | 4/1996 | Gluys et al. ................. 55/385.3 |
| 5,575,832 | A | * | 11/1996 | Boyd ............................ 95/91 |
| 5,591,243 | A | * | 1/1997 | Colussi et al. ................. 55/321 |
| 5,746,259 | A | * | 5/1998 | Noble, III ..................... 141/92 |
| 6,015,444 | A | * | 1/2000 | Craft et al. ................. 55/385.4 |
| 6,058,969 | A | | 5/2000 | Bollwahn et al. |
| 6,395,050 | B1 | * | 5/2002 | Wickland et al. .......... 55/385.4 |
| 6,395,068 | B1 | * | 5/2002 | Rooney ..................... 55/385.4 |

(Continued)

FOREIGN PATENT DOCUMENTS

EP 0939250 A2 9/1999

*Primary Examiner*—Minh-Chau T. Pham
(74) *Attorney, Agent, or Firm*—Novak Druce & Quigg

(57) ABSTRACT

Device for the ventilation of a transmission case (11) that is normally intended to hold liquid lubricant for transmission components and includes a residual internal volume of air inside the transmission case that is connected to the atmospheric pressure by way of a passage. With the aim of reducing the quantity of dirt particles than can get into the transmission case by way of the said passage, the passage includes a first section (27) with a certain flow area and a second section (26) with, by comparison, an at least approximately 50% larger flow area. The first section (27) is situated between the atmosphere and the second section (26). A compressed air source (18) is connected to the passage between the internal volume of the transmission case (11) and the first section (27).

11 Claims, 1 Drawing Sheet

U.S. PATENT DOCUMENTS 6,447,565 B1 * 9/2002 Raszkowski et al. ...... 55/385.4
6,726,752 B2 * 4/2004 Chen ........................... 96/190

2005/0145558 A1 * 7/2005 Ciak et al. .................. 210/420

* cited by examiner

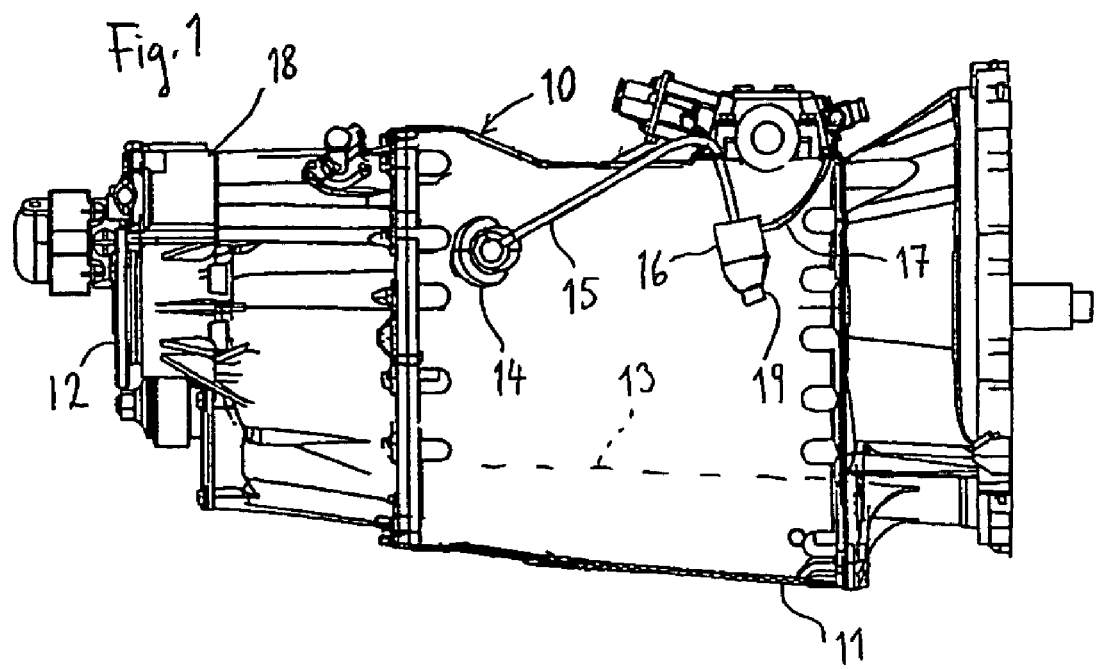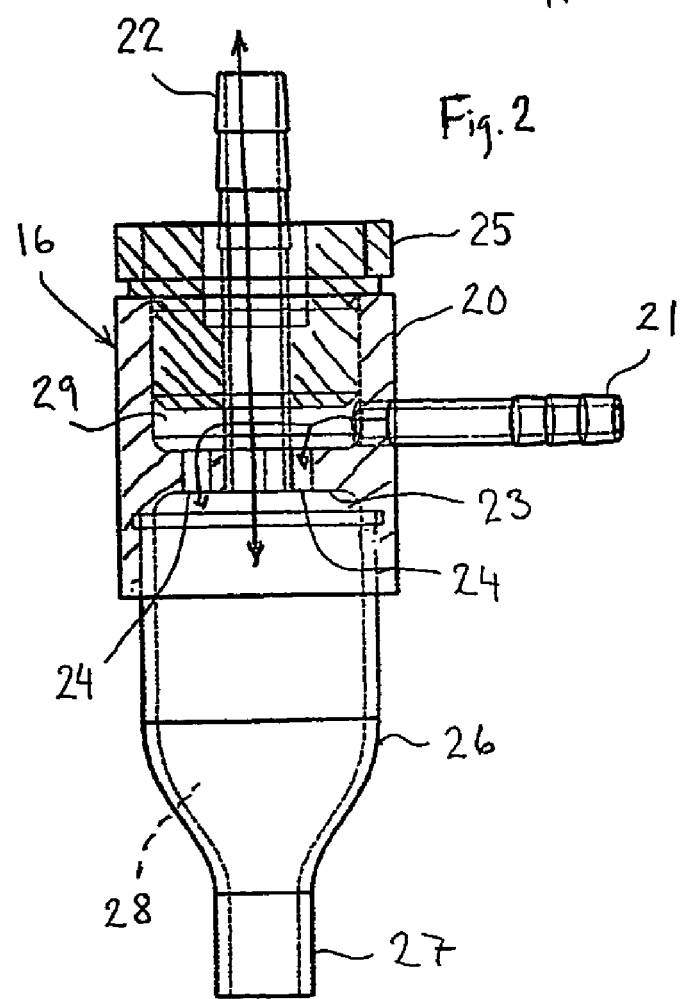

APPARATUS FOR VENTING A TRANSMISSION

CROSS REFERENCE TO RELATED APPLICATIONS

This application is a continuation patent application of International Application No. PCT/SE01/00792 filed 10 Apr. 2001 now abandoned which was published in English pursuant to Article 21(2) of the Patent Cooperation Treaty, and which claims priority to Swedish Application No. 0001994-3, filed 25 May 2000. Both applications are expressly incorporated herein by reference in their entireties.

BACKGROUND OF INVENTION

1. Technical Sphere

The present invention relates to methods and devices for the ventilation of a transmission case intended to hold liquid lubricant for transmission components and in which a residual volume of air in the transmission case is connected to atmospheric pressure by way of a passage.

2. Background

In addition to transmission parts, a transmission case such as a gearbox also contains space for lubricating oil and air. The volume of air changes when the temperature of the transmission parts, the oil and/or the air, rises or falls. Temperature variations from −40° C. to approximately +120° C. can occur. A connection between the volume of air inside the transmission case and the outer atmosphere is required in order to equalize the pressure so that neither excess pressure nor negative pressure is formed in the transmission case as such pressures can be harmful to the seals of the case. A hole is generally bored in the upper part of the transmission case and is provided with a nipple and a short length of hose, or a nipple with a protective cover or filters that are intended to prevent water or dirt from getting into the transmission case. The exchange of air with the surroundings is referred to as breathing and may amount to as much as approximately ten liters in the case of a large truck. The exchange of air is achieved primarily when air is drawn into the gearbox, as it cools after driving, or on starting and subsequent driving on a long, steep incline. It has emerged that contamination such as sand and salt can get into the gearbox through breathing and can cause damage to bearings, gears, friction surfaces and seals. Filters that can be used to trap particles may furthermore be provided with an overflow valve, which runs the risk of sticking in the open position and letting in contamination.

SUMMARY OF INVENTION

One purpose of the invention is to produce a ventilation device that is maintenance-free and which effectively reduces the amount of dirt that might reach the inside of the transmission case.

In at least one embodiment, the invention takes the form of a passage includes a first section with a certain flow area and a second section with, by comparison, flow area that is larger by at least approximately 50%. The first section is situated between atmosphere and the second section and a compressed air source is connected to the passage between the transmission case and the first section. This design, according to the invention, provides a simple and effective particle trap that can be automatically blown clean of trapped dirt particles.

BRIEF DESCRIPTION OF DRAWINGS

The invention will be described in more detail below with reference to an exemplary embodiment, which is shown in the drawing attached, in which:

FIG. 1 is a schematic diagram, which in a side view shows a transmission case with a ventilation device according to the invention, and FIG. 2 shows, on a larger scale, a section through the ventilation device shown in FIG. 1.

DETAILED DESCRIPTION

The gearbox 10 shown in FIG. 1 includes a transmission case 11 having, among other things, an output shaft 12; and is as well provided with bearings, shafts, gears, synchromesh elements and operating elements for shifting between various working positions. The inside of the transmission case is filled to a certain level 13 with oil and in addition accommodates a residual volume of air that is connected to the surrounding atmosphere by way of a hose nipple 14 and a ventilation device 16 connected thereto by way of a flexible hose 15. The ventilation device is in turn connected, by way of a branch line 17, to a ventilation port 18 of an air cylinder and also has a combined inlet/outlet opening 19.

As can be seen from FIG. 2, the ventilation device 16 includes a cylindrical casing part 20 with a connection 21 aligned transversely to the longitudinal axis and an axial connection 22, which is supported by a transverse center wall 23. The connection 21 opens out into the casing part on one side of the center wall 23, which is provided with hole openings 24. The end of the casing part situated nearest to the connections is closed by means of an expansion-fit plug 25, which is provided with a central opening that forms a bushing and seal against the connection 22.

The opposite end of the casing part 20 accommodates a bottle-shaped end-piece 26 with a tapered neck opening 27 remote from the casing part. Both connections 21, 22 are provided with conical ridging for securing the hose sections 15, 17.

The ventilation device functions as follows: Dirt particles that get into the ventilation device by way of the neck opening 27 have a certain air velocity. After having passed through the neck opening 27, the particles reach the space 28 formed by the casing part 20 and the end-piece 26 which has significantly larger flow area (an approximately 3 times larger flow area in the example shown). This results in a significant reduction in the particle-bearing air velocity. This means that most particles that get into the space 28 loose their capacity for movement and therefore remain in the space. Particles collected in the space 28 in the manner described above are not significantly affected by this flow. The space 28 is, however, periodically cleaned by a pressure surge each time the ventilation port 18, which is connected to the connection 21, is activated. This pressure surge may be triggered, for example, each time a pneumatically controlled gear is operated. The frequency of this operation naturally varies depending on how the vehicle is used and how many air cylinders there are for changing. Pressure surges can normally be expected with a frequency between approximately twice every 10 km to approximately 20 times every 10 km. The connection 21 opens into a space 29 on the opposite side of the center wall 23 to the space 28, the air flowing through openings 24 into the space towards the hole opening 27. Consequently, the air is forced away from the internal passage of the connection 22. A normal pressure surge can result in an air flow with a speed of approximately 15 meters per second.

The ventilation device described above can be applied easily and cost-effectively to existing transmission cases. It is also possible to incorporate the ventilation device directly into the transmission case in new design constructions, it being feasible to form the passages from molded wall sections that are outwardly sealed by means of a cover.

The invention must not be regarded as being confined to the exemplary embodiments described above, a number of other variants and modifications being conceivable within the scope of the following claims.

The invention claimed is:

1. A device for the ventilation of a transmission case intended to hold liquid lubricant for transmission components, said device comprising:
   a passage connected between a residual volume of air inside the transmission case and atmospheric pressure outside the transmission case;
   the passage comprising a first section with a certain flow area and a second section with, by comparison, an at least approximately 50% larger flow area, the first section being situated between the atmosphere and the second section; and
   a compressed air source connected to the passage between the inside of the transmission case and the first section.

2. The device as recited in claim 1, wherein passage further comprises a third section that extends between the inside of the transmission case and the second section.

3. The device as recited in claim 2, wherein the third passage section comprises a connection leading to the compressed air source.

4. The device as recited in claim 3, wherein the connection opens into the second passage section and is directed towards the first passage section.

5. The device as recited in claim 1, wherein the second section of the passage is designed as a cylindrical chamber with a largely vertical longitudinal axis.

6. The device as recited in claim 1, wherein the compressed air source consists of a ventilation port from an air cylinder.

7. The device as recited in claim 6, wherein the air cylinder is adapted to be used for the operation of transmission components in the transmission case.

8. The device as recited in claim 2, wherein the third passage section is designed so that it presents a greater flow resistance that the first passage section.

9. A device for ventilating a transmission case adapted to hold liquid lubricant for transmission components, said device comprising:
   a passage connectable between a residual volume of air inside a transmission case and the atmosphere outside the transmission case, the passage comprising an expansion portion that tapers to a neck opening leading to atmospheric air that is to be drawn into the device;
   the expansion portion being positioned downstream to the neck opening and having a sufficiently large area to cause suspended particles swept through the neck opening to fall out of suspension and be trapped therein; and
   a compressed air source connected to the device and configured to backwash trapped particles from within the expansion portion.

10. The device as recited in claim 9, wherein a flow area of the neck opening is approximately 50% less than a flow area of the expansion portion.

11. The device as recited in claim 9, further comprising:
   a conduit extending from the expansion portion and connectable to a residual volume of air inside a transmission case; and
   an annulus formed at least partially about the conduit, the annulus establishing a flow path for compressed air utilized to backwash trapped particles from within the expansion portion.

* * * * *